United States Patent [19]

Godwin, Sr.

[11] Patent Number: 5,058,956
[45] Date of Patent: Oct. 22, 1991

[54] HYDRAULICALLY ACTUATED TARP EXTENSION AND RETRACTION SYSTEM FOR A TRUCK

[76] Inventor: James P. Godwin, Sr., Rte. 5, P.O. Box 8, Dunn, N.C. 28334

[21] Appl. No.: 628,849

[22] Filed: Dec. 13, 1990

[51] Int. Cl.$^5$ ............................................. B60P 7/04
[52] U.S. Cl. ................................ 298/23 C; 298/23 R; 296/100; 296/98
[58] Field of Search ................... 298/23 C, 23 R, 1 R; 296/100, 98, 101, 136, 111, 112, 113; 105/377; 135/5 A; 160/66-68, 311

[56] References Cited

U.S. PATENT DOCUMENTS

| | | | |
|---|---|---|---|
| 2,183,813 | 12/1939 | Howard et al. | 298/23 C |
| 3,549,198 | 12/1970 | Cappello | 296/100 |
| 3,549,199 | 12/1970 | Sibley | 296/100 |
| 3,868,142 | 2/1975 | Bachand et al. | 296/98 |
| 3,913,969 | 10/1975 | Hoch | 296/100 |
| 4,050,734 | 9/1977 | Richard | 296/100 X |
| 4,095,840 | 6/1978 | Woodard | 296/100 |
| 4,157,202 | 6/1979 | Bachand | 296/100 |
| 4,225,175 | 9/1980 | Fredin | 296/100 X |
| 4,341,416 | 7/1982 | Richard | 296/100 X |
| 4,874,196 | 10/1989 | Goldstein et al. | 296/98 |
| 4,893,864 | 1/1990 | Bailey | 296/98 |
| 4,981,317 | 1/1991 | Acosta | 296/98 |

FOREIGN PATENT DOCUMENTS

| | | | |
|---|---|---|---|
| 1134888 | 11/1982 | Canada | 296/98 |
| 1211107 | 2/1986 | U.S.S.R. | 296/98 |

Primary Examiner—Frank E. Werner
Assistant Examiner—Brian K. Dinicola
Attorney, Agent, or Firm—Rhodes, Coats & Bennett

[57] ABSTRACT

The present invention entails a hydraulically actuated tarp retraction and extension system for a truck wherein the system provides for the automatic extension or retraction of a tarp about the load bed of the truck. A tarp reel assembly is provided and includes a a tarp which is biased by the reel assembly itself to assume a wound or retracted position. A pair of swing arms are connected to a leading edge of the tarp and are in turn connected to a hydraulic control system which is operative to extend the tarp to a covered position over the load bed and wherein the tarp reel assembly is operative to wind the tarp in response to the arms being moved towards the tarp reel assembly. In one mode of operation, the hydraulic control system automatically provides for the retraction of the tarp in response to the load bed of the vehicle being raised from a horizontal position to a generally vertical dumping position.

17 Claims, 4 Drawing Sheets

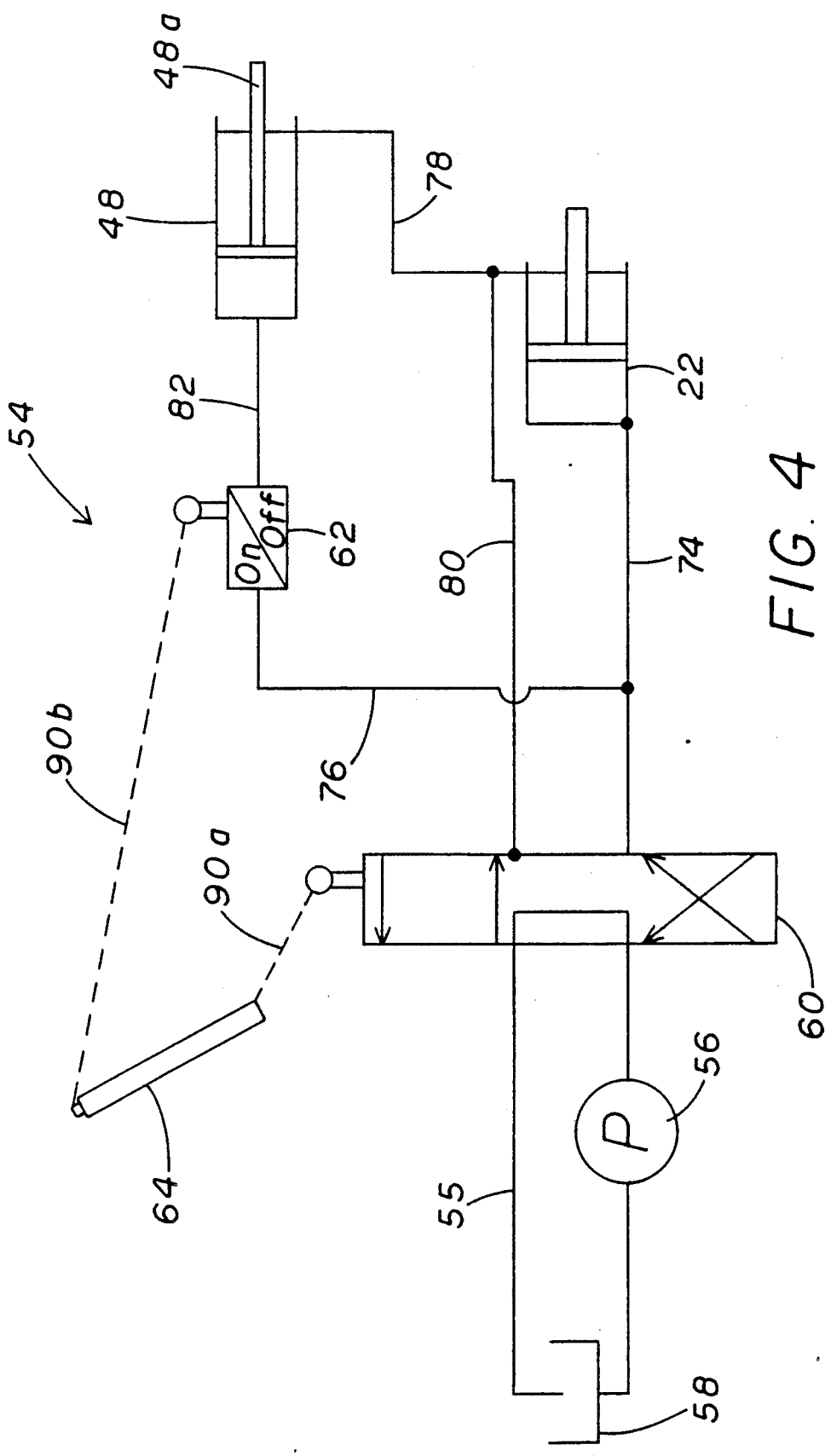

HYDRAULICALLY ACTUATED TARP EXTENSION AND RETRACTION SYSTEM FOR A TRUCK

FIELD OF THE INVENTION

The present invention relates to tarp systems for covering the load bed of a dump truck, and more particularly to a tarp retraction and extension system that is hydraulically controlled.

BACKGROUND OF THE INVENTION

Covering a truck's load bed during transportation of materials is necessary, and often required by statute, to help prevent the dangerous problem of materials being blown or jolted from the truck. Tarp extension and retraction systems for moving a tarp covering between an extended position covering a truck load bed and a retracted position leaving the cargo-area of the load bed unobstructed are standard on trucks using load beds to transport materials. The typical, prior art tarp extension and retraction systems use a manual crank system to adjust a truck bed cover between the extended covering position and the retracted loading/unloading position.

Structurally, the prior art manual crank system includes the following basic elements: a tarp reel assembly located near the forward portion of the load bed; a pair of swing arms pivotally attached to the sides of the load bed and spring biased towards the rear of the truck; a tarp with one edge attached to the tarp reel assembly and a leading edge attached to the pair of swing arms; and a crank mechanism located on one side of the truck and linked to the tarp reel assembly. While in a retracted position, the tarp is wound-up on the tarp reel assembly and the swing arms are pivotted to a forward position, leaving the cargo-area unobstructed. In contrast, while in the extended position the swing arms are pivotted rearwardly towards the truck's tailgate and the attached tarp is extended over the cargo-area of the truck.

The dynamics of the tarp system are best illustrated by describing what mechanically occurs when moving the tarp from an extended position to a retracted position. First, the manual crank mechanism is rotated causing the tarp reel assembly to rotate and wind-up the tarp. This pulls the leading edge of the tarp which is attached to the swing arms towards the front of the load bed, overcoming a rearward bias on the swing arms caused by springs attached between the sides of the load bed and the swing arms. This process continues until the cover is in a restracted position and the swing arms are in their forward position adjacent to the tarp reel assembly.

When the cover is in a retracted position the cover can be put into the extended position by releasing the lock on the crank mechanism. The spring bias then pulls the swing arms towards the truck's rear and the attached tarp is pulled over the load bed.

In order to operate the cover mechanism described above, four main steps are required of the operator. First, the operator must get out of the truck and go to where the crank mechanism is located on the truck. Second, the operator must remove the crank mechanism from its locked position. Third, the operator must mannually control the rotation of the crank. Last, the operator must place the crank in a locked position.

The safety of the operator, the number and difficulty of operator steps, and durability are all factors in determining the effectiveness of a tarp system. An examination of each of these factors with respect to the above described prior art cover system reveals many problems in the prior art design.

First, the cover system is not operator safe because of the substantial rearward spring tension on the swing arms when the tarp is in a retracted position. Tension in the swing arms results in a substantial corresponding rotational force in the crank mechanism at high velocity. Thus, a dangerous situation is created such that the operator must grip the crank firmly and continuously when manually rotating the crank to prevent the counter-rotational force from causing the crank to forcefully rotate out of control. If the crank slips from the hand of the operator, which is not unlikely due to the considerable rotational force on the crank handle, or if the operator inadvertently releases the handle before locking the crank, the crank may forcefully rotate out of control and strike the operator standing nearby.

The operator steps required to adjust the tarp also unnecessarily complicated, time consuming, and inconvenient. As previously described, the prior art tarp system requires the operator to leave the truck's cab and perform a series of manual steps to alter the position of the cover. A tarp system permitting the operator to alter the position of the tarp in a simpler, more convenient manner is desired.

Prior art tarp systems also fails to recognize or account for an important problem which may result from operatorerror. Conventional dump trucks include a hydraulic dump cylinder for moving the load bed from a horizontal to a vertical position to dump material from the load bed. For the dumping of most materials, the tarp should be in the retracted position to ensure that the cover will not be in the path of the flow of material during unloading. The prior art tarp system provides no safety feature to help prevent the operator from inadvertently raising the load bed to unload the material without placing the tarp in a retracted position. Hence, through operator error the cover may be in an extended position during unloading resulting in the cover being in the path of the material flowing from the truck bed. This scenario may result in substantial and expensive damage to the cover mechanism.

Last, the external positioning of the prior art cover mechanism may result in problems and reduce the overall durability of a truck. For example, trucks used to transport loose materials often must be closely maneuvered around various obstructions and structures in order to load or unload material. During this maneuvering, a tarp system mounted on the side of a truck is exposed to damage caused by the truck grazing or striking obstructions located along the truck's path. The crank mechanism of the prior art tarp system has the problem of being exposed on the side of the truck reducing the durability of the tarp system.

There is a distinct need for a cover mechanism which reduces the risk of danger to the operator, reduces the number and difficulty of operator steps, provides safety features to help prevent operator error, and increases the durability of the cover mechanism.

SUMMARY AND OBJECTS OF THE INVENTION

The present invention entails a cover or tarp extension and retraction system which is an improvement over and solves many of the problems of the prior art tarp systems. The tarp system of the present invention can be used on any truck with a load bed, but for purposes of illustration, the tarp system will be described as used on a dump truck having a chasis, a cab, and a load bed that can be moved between a normal horizontal position and a vertical dumping position. The improved tarp system provides a safer and more efficient mechanism to move a tarp between an extended position covering the load bed and a retracted position leaving the load bed unobstructed for loading and unloading.

To perform this function of altering the tarp position, the tarp system of the present invention includes a tarp reel assembly which automatically takes-up and winds the tarp when the tarp is moved from an extended position to a retracted position. Structurally, the tarp reel assembly is mounted to a forward portion of the load bed and extends transversely across the width of the truck. One edge of the tarp is connected to the tarp reel assembly and a tarp reel assembly biasing means is ued to take-up and wind the tarp onto the tarp reel assembly.

A tarp actuating assembly is used to overcome the biasing means of the tarp reel assembly and pull the tarp from the retracted position to an unwound, extended position. In the preferred embodiment, the tarp actuating assembly includes a pair of swing arms pivotally attached to the sides of the truck and adjustable between a forward position and a rearward position. By connecting the leading edge of the tarp to the swing arms, the positioning of the swing arms controls the position of the tarp between its extended and retracted positions.

While the tarp is in a retracted, wound position the swing arms are pivoted to a forward position. To overcome the bias of the tarp reel assembly and pull the tarp towards an extended position, a hydraulic control system forceably adjusts the position of the swing arms. Likewised, when the tarp is in an extended position the hydraulic control system is used to force the swing arms to a forward position. During this movement of the swing arms to a forward position, the biasing means of the tarp reel assembly is taking-up the slack produced in the tarp and winding the tarp around the tarp reel assembly.

The hydraulic control system is also designed with a safety feature which automatically places the tarp in a retracted position before the dump bed is shifted from a horizontal position to a vertical dumping position. This design feature may be bypassed by the operator when necessary and the load bed moved independently of the tarp actuating assembly. However, under normal operating situations this design feature helps prevent an operator from inadvertently moving the load bed to a vertical dumping position with the tarp in an extended position thus preventing the tarp system from being possibly damaged by the dumped material.

It is therefore an object of the present invention to provide a tarp extension and retraction system that is efficient and convenient to operate.

Another object of the present invention is to improve the safety of an operator during the moving of a tarp between the extended and retracted tarp positions.

Another object of the present invention is to improve the durability of tarp extension and retraction systems.

Still another object of the present invention is to provide a tarp extension and retraction system which requires less maintenance and repair than prior art systems.

Another object of the present invention is to provide a tarp extension and retraction system which requires fewer external structures on the outer body of a truck.

Another object of the present invention is to provide a safety feature which automatically places the tarp in a retracted position when a truck's load bed is moved from a horizontal position to a vertical dumping position.

Other objects and advantages of the present invention will become apparent and obvious from a study of the following description and the accompanying drawings which are merely illustrative of such invention.

BRIEF DESCRIPTION OF THE DRAWINGS

FIG. 4 is a schematic illustration of the hydraulic control system for controlling the tarp system of the present invention.

DETAILED DESCRIPTION OF THE INVENTION

Figure 1:
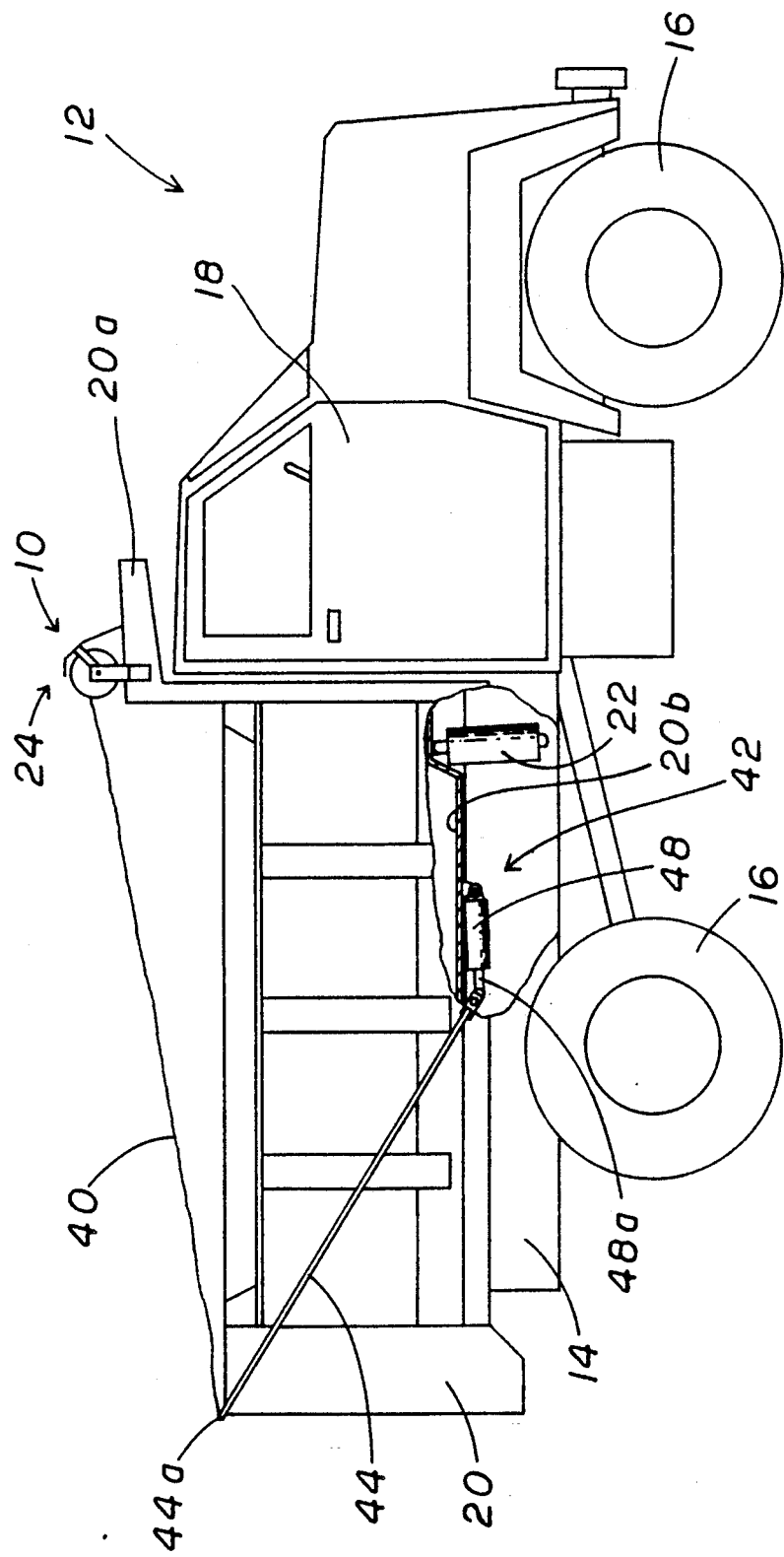
FIG. 1 is a side elevational view of a dump truck having the tarp retraction and extension system of the present invention incorporated therein.

With further reference to the drawings, the automatic tarp extension and retraction system of the present invention is shown therein and indicated generally by the numeral 10. Automatic tarp extension and retraction system 10 is mounted on a conventional dump truck indicated generally by the numeral 12. Viewing dump truck 12 it is seen that the same includes chasis 14, wheels 16, cab 18, and a load bed 20 having an upper forward cab shield 20a. Anchored to the chasis 14 and connected to the load bed 20 is a hydraulic dump cylinder 22. It is appreciated that the dump cylinder 22 can be disposed and mounted in a number of conventional orientations.

Figure 3:
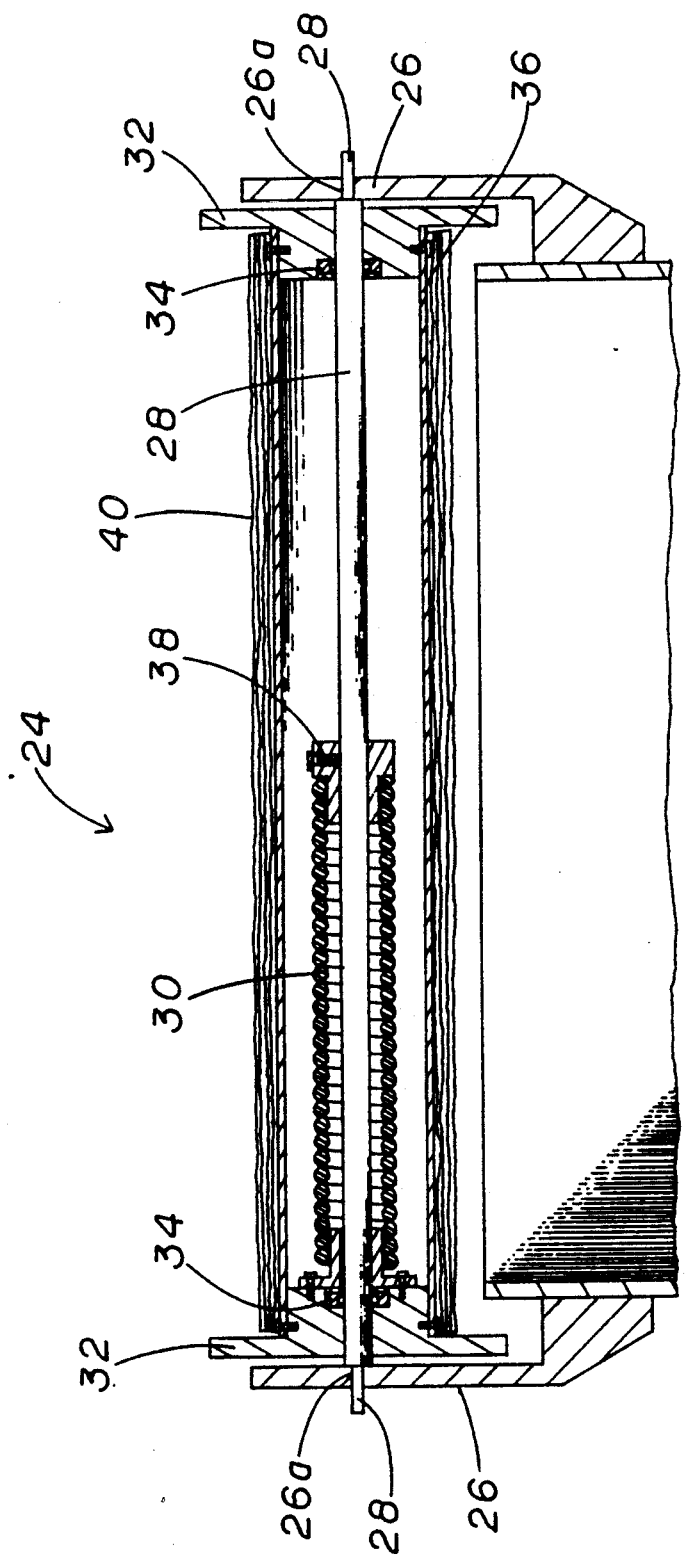
FIG. 3 is a transverse sectional view of the tarp reel assembly that forms a part of the tarp system of the present invention.

Mounted above the load bed 20 on the cab shield 20a is a tarp reel assembly 24 (FIG. 3). Tarp reel assembly 24 is mounted to a mounting frame 26 that extends up from the cab shield 20a and includes shaft openings 26a. The tarp reel assembly includes a fixed rod 28 which is stationarally fixed between shaft opening 26a. Rotatively journalled about opposite ends of the fixed rod 28 is a pair of end cap hubs 32. Each hub 32 includes a bearing 34 that enables the hub to rotate freely about the fixed rod 28. Inner-connected and fixed between the hub 32 is a cylindrical spool 36 that rotates with the hub 32. The outer end of a tortion spring 30 is secured to the left side, as viewed in FIG. 3, of the hub 32 while an inner end of the tortion spring 30 is secured to the mid portion of fixed rod 28 through a bolt or screw 38.

Connected to the tarp reel assembly 24 is a tarp 40 having a leading edge 40a and a second anchored edge 40b. The tarp anchored edge 40b is connected to the cylindrical spool 36 of tarp reel assembly 34 and the leading edge 40a of the tarp 40 is connected to a tarp actuating assembly 42.

Figure 2:
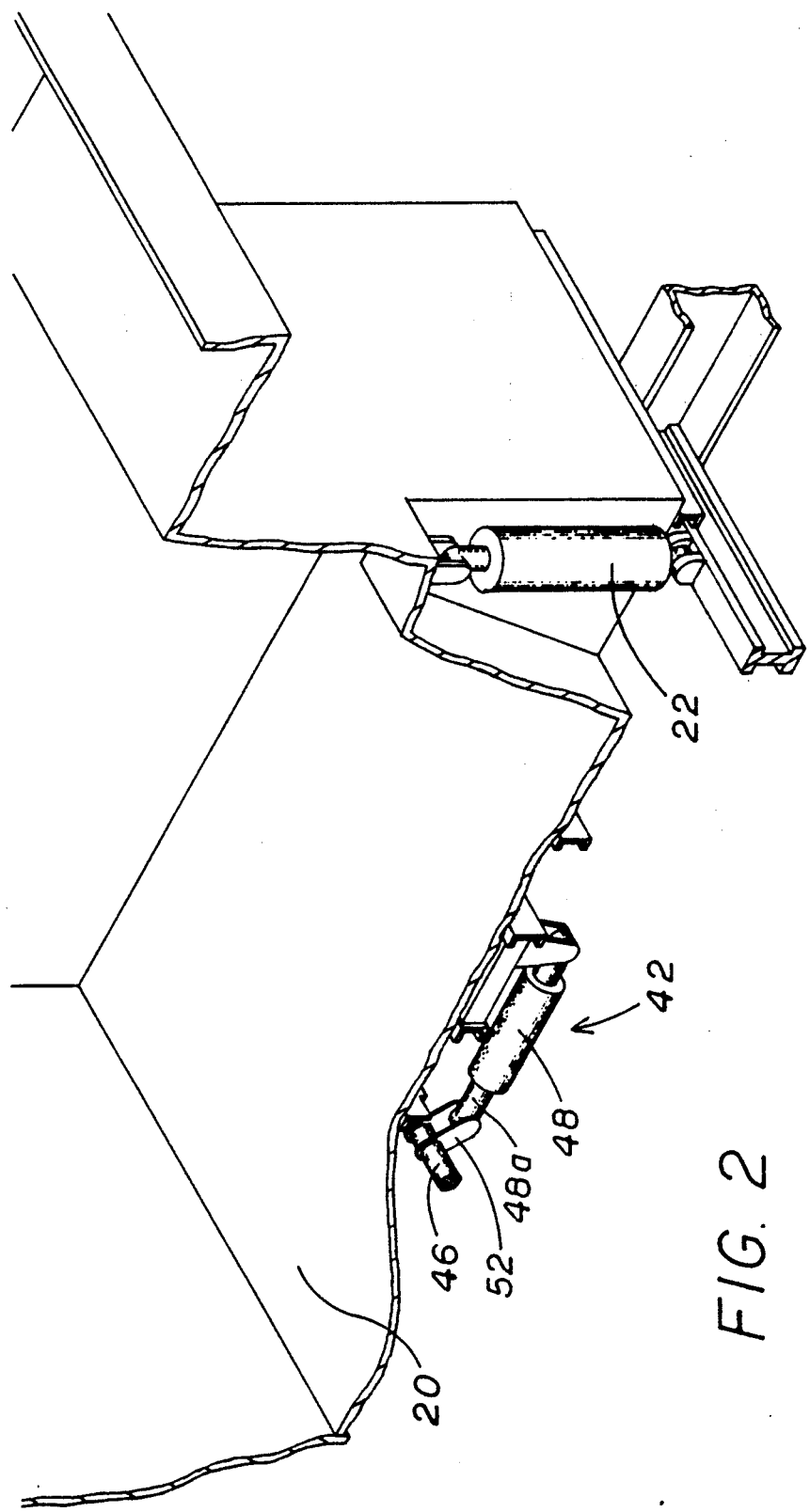
FIG. 2 is a fragmentary perspective view showing in cut-away fashion the load bed of a dump truck and the portions of the hydraulic system utilized to control and actuate the tarp system of the present invention.

Viewing FIGS. 1, 2 and 4, it is seen that the tarp actuating assembly 42 includes a pair of swing arms 44, a rock shaft 46 and tarp actuating cylinder 48 having a rod end 48a. Swing arms 44 are connected together by rock shaft 46 which extends transversely beneath the floor of the load bed 20. Tarp actuating cylinder 48 is anchored beneath the load bed. The rod end 48a of the tarp actuating cylinder 48 is connected to rock shaft 46 through a coupler 52 which rotates the rock shaft 46 in response to movements of the actuating cylinders' rod end 48a.

Referring to FIG. 1, it is further seen that the swing arms 44 extend vertically along and above the sides of the load bed 20 and are connected to the leading edge of the tarp 40. The hydraulic control system 54 controls the positioning of the swing arms 44 which adjust the position of the tarp leading edge 40a.

Referring to FIG. 4, it is seen that the hydraulic control 54 includes a pump 56, reservoir 58, and a three-position hydraulic control valve 60, an on/off valve 62 and control lever 64. Control valve 60 is hydraulically connected to both ends of the dump cylinder 22 via lines 74 and 80. In addition, hydraulic line 76 extends from line 74 to the on/off valve 62. Connected between the on/off valve 62 and the hydraulic cylinder 48 is a connecting line 82. The rod ends of the dump cylinder 22 and tarp actuating cylinder 48 are inner connected via line 78.

Control valve 60 includes a central neutral position, an upper position and a lower position as viewed in FIG. 4. Control lever 64 is operatively connected to the control valve 60 via a control line 90a, while the same control lever 64 is connected to the on/off valve 62 via a control line 90b.

To retract the tarp from an extended position as shown in FIG. 1, the control valve 60 is shifted to the upper position which is a tarp retraction position. With the load bed in the horizontal position, as shown in FIG. 1, hydraulic fluid from pump 56 is directed through the control valve (while positioned in the upper position) into line 74. Since the load bed is in the general horizontal position then substantial resistance is present due to the weight of the load bed and thus fluid in line 74 passes into line 76 and because the on/off valve 62 is in the "on" position, fluid can flow therethrough, through line 82 into the anchor or base end of the tarp actuating cylinder 48. The flow of fluid into the base of the tarp actuating cylinder 48 extends the piston therein since the force required to extend the piston and rod of cylinder 48 is less than that required to extend the piston and rod of the dump cylinder 22. The extension of the rod of the actuating cylinder 48 causes the swing arms 44 to be rotated. As the swing arms pivot towards the front of the load bed 20, the tortion spring 30 forming a part of the tarp reel assembly 24 causes the tarp reel assembly 24 to take-up the tarp in the process. Once the piston and rod of the actuating cylinder 48 has been fully extended, then sufficient force will have built up in the system to drive or actuate the dump cylinder 22 causing the load bed to be pivoted from its general horizontal position to a vertical dumping position. During this time, fluid expelled from both cylinders 22 and 48 can be returned to the reservoir 58 via lines 78, 80 and 55.

To lower the load bed 20, the control valve 60 is shifted to the lowermost position where fluid is directed from pump 56 into line 80. In this position the weight of the load bed will cause the load bed itself to move downwardly towards its horizontal position since the fluid in the dump actuating cylinder 22 can be expelled back to the reservoir 58 through lines 74 and 55. It should be pointed out that it takes less force or pressure to retract the dump cylinder 22 than it does to extend the tarp actuating cylinder 48. But once the load bed has returned to the horizontal position, the tarp 40 can be extended by maintaining the control valve 60 in the lowermost position causing fluid in line 80 to be directed into line 78 which causes the tarp actuating cylinder to be retracted causing the swing arms to be pivoted counter clockwise as viewed in FIG. 1 towards the extended position. Because control valve 62 remains open, it follows that fluid can be expelled from the tarp actuating cylinder 48 through lines 82, 76 and 55 into reservoir 58.

It follows then, that with the load bed in the general horizontal position, that the tarp 20 can be extended and retracted to where the leading edge 40a of the tarp 40 is positioned at any desired point between the front and rear of the load bed 20.

The on/off control valve 62 provides another important functional capability for the tarp extension and retraction system of the present invention. Control valve 62 enables the operator to set the tarp at any position he desires and then place the control valve 62 in the "off" position which will station the tarp at that position and will allow the load bed and particularly the dump bed cylinder 22 to be controlled and actuated independently of the tarp actuating cylinder 48. As can be seen from FIG. 4, once the control valve 62 is placed in the "off" position by control lever 64, then the dump cylinder 22 can be totally operated independently of the tarp actuating cylinder 48. This is particularly beneficial in some areas where state law requires a load bed to be covered at least partially when it is diposed in a dumping position, such as a case where the vehicle is being used to dispense or pour salt onto a frozen highway. In these cases, it is appreciated that the tarp can be positioned so that it completely extends over the load bed or over any part thereof and yet the load bed can be raised and lowered between the horizontal position and any dumping position.

From the foregoing specification and discussion, it is seen that the tarp actuating system of the present invention is safe, reliable and offers a great deal of flexibility in the operation of the tarp system of the present invention. Of key importance is the fact that the hydraulic control system enables the operator to place the same in a mode that will automatically retract the tarp prior to the load bed being moved from a transport or horizontal position to a dumping position. At the same time the hydraulic system will enable an operator to station the tarp in any position over the load bed and still operate the load bed independently of the tarp actuating cylinder 48. Beyond that, the tarp extension and retraction system of the present invention is easy to operate and is reliable.

The present invention may, of course, carried out in other specific ways than those herein set forth without parting from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. A cover assembly for a dump truck having a movable truck bed and actuating means for raising and lowering said truck bed comprising:
  (a) a take-up roll having a truck bed cover wound thereon, one end of the cover being attached to the roll and the other end being free;

(b) means for mounting the take-up roll to the truck bed;
(c) means for unreeling the cover from the take-up roll to cover the truck bed, said means for unreeling the cover including:
  (1) a pair of swing arms pivotally mounted to the truck bed and movable between a first position in which the cover is wound on the reel and a second position in which the cover is extended across the truck bed;
  (2) swing arm actuating means for moving the swing arms between said first and second positions, and
(d) interlock means interconnected between the swing arm actuating means and the truck bed actuating means to prevent operation of the truck bed actuating means unless said pair of swing arms are in the first position.

2. The cover assembly according to claim 1 wherein the take-up roll is mounted to the front end of the truck bed and wherein the free end of the cover is connected to the swing arms.

3. The cover assembly according to claim 1 further including override means to override the interlock means and permit operation of the truck bed actuating means irrespective of the position of the swing arms.

4. A method for covering and uncovering a truck bed movable between a generally lowered position and a raised position comprising:
  (a) mounting a take-up roll having a truck bed cover wound thereon to said truck bed;
  (b) operatively connecting the take-up roll with a pair of swing arms pivotally mounted to the truck bed;
  (c) operatively connecting the swing arms to a swing arm actuating means for pivoting the swing arms between (first) extended and retracted positions to selectively wind and unwind the cover from the take-up roll; and
  (d) interlocking the swing arm actuating means with a truck bed actuating means to prevent operation of the truck bed actuating means unless the swing arms are in the retracted position.

5. A cover assembly for a dump truck having a movable truck bed and actuating means for raising and lowering said truck bed, comprising:
  (a) a take-up roll having a truck bed cover wound thereon, one end of the cover being attached to the roll and the other end being free;
  (b) means for unreeling the cover from the take-up roll to cover the truck bed, said means for unreeling the cover including:
    (1) a pair of swing arms pivotally mounted to the truck bed and movable between a first position in which the cover is wound on the reel and a second position in which the cover is extended across the truck bed;
    (2) swing arm actuating means for moving the swing arms between said first and second positions; and
  (c) interlock means interconnected between the swing arm actuating means and the truck bed actuating means to prevent operation of the truck bed actuating means unless said swing arms are in the first position.

6. The cover assembly according to claim 5 wherein the take-up roll is mounted to the front end of the truck bed and wherein the free end of the cover is connected to the swing arms.

7. The cover assembly according to claim 5 including means for biasing the truck bed cover to a wound retracted position.

8. The cover assembly according to claim 7 wherein the truck bed cover biasing means includes a torsion spring.

9. The cover assembly according to claim 5 wherein the swing arm actuating means includes a rock shaft.

10. The cover assembly according to claim 5 further including override means to override the interlock means to permit operation of the truck bed actuating means irrespective of the position of the swing arms.

11. The cover assembly according to claim 5 wherein the take-up roll includes a frame structure, a fixed shaft extending within the frame structure, a reel rotatively mounted about the fixed shaft, and a torsion type spring anchored at one point to the fixed shaft, and at a second point to the reel and wherein the truck bed cover is connected to the reel.

12. The cover assembly according to claim 5 including hydraulic control means operatively connected to the truck bed actuating means and the swing arm actuating means for controlling the same.

13. The cover assembly according to claim 12 wherein the hydraulic control means includes an auxiliary control means for controlling the position of the swing arms independently of the position of the truck bed.

14. The cover assembly according to claim 13 wherein the auxiliary control means includes an on/off valve interconnected between the swing arm actuating means and the truck bed actuating means.

15. The cover assembly according to claim 13 wherein the hydraulic control means includes a control valve operatively connected between a pump and the swing arm actuating means and the truck bed actuating means.

16. The cover assembly according to claim 13 wherein the hydraulic control means further includes means for isolating the swing arm actuating means from the truck bed actuating means such that the swing arms may be positioned at various positions between the first and second positions while still allowing the load bed to be moved between raised and lowered positions without affecting the position of the swing arms.

17. The cover assembly according to claim 16 wherein the means for isolating the swing arm actuating means from the truck bed actuating means includes an on/off control valve interconnected between a multi-positional control valve forming a part of the hydraulic control means and the swing arm actuating means.

* * * * *